US012567746B2

(12) United States Patent
Miranbeigi et al.

(10) Patent No.: US 12,567,746 B2
(45) Date of Patent: Mar. 3, 2026

(54) POWER CONVERTERS UTILIZING DEEP LEARNING NEURAL NETWORKS AND METHODS OF USE

(71) Applicant: Georgia Tech Research Corporation, Atlanta, GA (US)

(72) Inventors: Mohammadreza Miranbeigi, Atlanta, GA (US); Rajendra Prasad Kandula, Atlanta, GA (US); Deepak M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 356 days.

(21) Appl. No.: 18/276,360

(22) PCT Filed: Feb. 9, 2022

(86) PCT No.: PCT/US2022/015778
§ 371 (c)(1),
(2) Date: Aug. 8, 2023

(87) PCT Pub. No.: WO2022/173800
PCT Pub. Date: Aug. 18, 2022

(65) Prior Publication Data
US 2024/0120739 A1 Apr. 11, 2024

Related U.S. Application Data

(60) Provisional application No. 63/147,617, filed on Feb. 9, 2021.

(51) Int. Cl.
*H02J 3/18* (2026.01)
*H02J 3/01* (2026.01)
(Continued)

(52) U.S. Cl.
CPC .............. *H02J 3/1835* (2013.01); *H02J 3/01* (2013.01); *H02J 13/13* (2026.01)

(58) Field of Classification Search
CPC .... H02J 13/00006; H02J 2203/20; H02J 3/01; H02J 3/1835; H02J 3/1842
See application file for complete search history.

(56) References Cited

U.S. PATENT DOCUMENTS

| | | |
|---|---|---|
| 2010/0169030 A1 | 7/2010 | Parlos |
| 2012/0063179 A1 | 3/2012 | Gong et al. |

(Continued)

FOREIGN PATENT DOCUMENTS

| | | |
|---|---|---|
| WO | 2020/124010 A1 | 6/2020 |

OTHER PUBLICATIONS

International Search Report and Written Opinion from Application No. PCT/US2022/015778 dated May 11, 2022.

*Primary Examiner* — Yong J Choe
(74) *Attorney, Agent, or Firm* — TROUTMAN PEPPER LOCKE LLP; Ryan A. Schneider; Christopher C. Close, Jr.

(57) ABSTRACT

An exemplary embodiment of the present disclosure provides a power converter system comprising a power converter. The power converter system can comprise a power converter electrically connected to a local power supply and an electrical utility grid. The power converter can comprise an output configured to exchange electrical power with the electrical utility grid. The power converter can be further configured to monitor one or more electrical parameters of the electrical utility grid over a period of time and alter one or more electrical parameters of the output of the power converter based on the monitored one or more electrical parameters of the electrical utility grid in real time using a deep learning neural network.

22 Claims, 8 Drawing Sheets

(51) Int. Cl.
    *H02J 3/1835*      (2026.01)
    *H02J 13/13*       (2026.01)

(56)             References Cited

U.S. PATENT DOCUMENTS

| | | | |
|---|---|---|---|
| 2013/0322122 A1* | 12/2013 | Sigamani | H02M 7/06 |
| | | | 363/13 |
| 2014/0362617 A1 | 12/2014 | Li | |
| 2020/0195141 A1* | 6/2020 | Schwabe | G06F 1/26 |
| 2020/0313539 A1* | 10/2020 | Hall | H02M 1/4233 |
| 2021/0021206 A1 | 1/2021 | Wang et al. | |

* cited by examiner

Voltage and current signals before fault

Voltage and current signals during fault

Instant of fault incidence

Instant of fault recovery

POWER CONVERTERS UTILIZING DEEP LEARNING NEURAL NETWORKS AND METHODS OF USE

CROSS-REFERENCE TO RELATED APPLICATIONS

This application is a § 371 National Stage of International Patent Application No. PCT/US2022/015778, with an international filing date of 9 Feb. 2022, which International Patent Application No. PCT/US2022/015778 claims the benefit of U.S. Provisional Application No. 63/147,617, filed 9 Feb. 2021, each of which is incorporated herein by reference in its entirety as if fully set forth below.

FEDERALLY SPONSORED RESEARCH OR DEVELOPMENT

This invention was made with government support under DE-AR0000899 awarded by the U.S. Department of Energy. The government has certain rights in the invention.

FIELD OF THE DISCLOSURE

The various embodiments of the present disclosure relate generally to power converters, and more particularly to power converters utilizing deep learning neural networks.

BACKGROUND

Renewable energy sources are nowadays seen as reliable and environmentally friendly solutions that can replace conventional generators. Interfacing such sources with the electrical utility grid, however, can require high performance inverters capable of meeting standards requirements and riding through adverse grid conditions, like voltage sags/swells, faults, or steady voltage distortions, e.g., harmonics. Achieving this goal is not trivial as the loss of synchronism might occur during dire grid conditions. The main culprit, in most cases, is the Phase-Locked Loop (PLL) which fails to track the voltage and extract its phase properly. PLL comprises two loops—a grid-synchronization loop and a self-synchronization loop. The latter forces the system to diverge from the stable point, and becomes stronger when the grid impedance or the inverter current becomes bigger. Furthermore, the strong coupling between phase and frequency in PLL units causes extra oscillations when there is a phase jump or frequency jump on the grid side. Lastly, the design of the PLL loop filter comes with trade-offs. Better distortion-rejection capability leads to a more sluggish response, while making it faster makes the system prone to instability. Tuning PLL parameters is a non-trivial problem and highly depends on the grid strength and loads harmonics characteristics. In rapidly evolving distribution grids where the topology and source/load characteristics might change quite often, the PLL design could become very challenging.

There are various methods proposed in the literature to address PLL issues. In general, linear control schemes suffer from the aforementioned trade-off, while the limited proposed nonlinear schemes in the literature only mitigate these problems partially. Furthermore, in the conventional PLL schemes, correct estimation of the frequency is a prerequisite for being locked to the grid, therefore frequency variation affects the performance of PLLs.

The aforementioned issues become even more challenging for single-phase systems, where the orthogonal term is not readily available, and different techniques like Quadrature Signal Generator (QSG) or all-pass filter (APF) have to be used to generate the fictitious quadrature signal. These methods, however, cannot make a good estimation during fast transients and can lead to extra oscillations or even instability in many scenarios.

Accordingly, there is a need for improved systems and methods for synchronizing local power sources with the utility grid.

BRIEF SUMMARY

The present disclosure relates to power converters utilizing deep learning neural networks, methods of using such power converters, and methods of training such deep learning neural networks.

An exemplary embodiment of the present disclosure provides a power converter system comprising a power converter. The power converter system can comprise a power converter electrically connected to a local power supply and an electrical utility grid. The power converter can comprise an output configured to exchange electrical power with the electrical utility grid. The power converter can be further configured to monitor one or more electrical parameters of the electrical utility grid over a period of time and alter one or more electrical parameters of the output of the power converter based on the monitored one or more electrical parameters of the electrical utility grid in real time using a deep learning neural network.

In any of the embodiments disclosed herein, the one or more electrical parameters of the electrical utility grid can comprise an instantaneous voltage of the electrical utility.

In any of the embodiments disclosed herein, the power converter can be further configured determine one or more of a phase, amplitude, and frequency of the electrical utility grid in real time using the deep learning neural network.

In any of the embodiments disclosed herein, the power converter can be configured to alter the one or more electrical parameters of the output of the power converter by synchronizing one or more of a phase, amplitude, and frequency of the output of the power converter with the determined one or more of the phase, amplitude, and frequency of the electrical utility grid.

In any of the embodiments disclosed herein, the one or more of the phase, amplitude, and frequency of the electrical utility grid can correspond to a phase, amplitude, and frequency, respectively, of a fundamental harmonic of the electrical utility grid.

In any of the embodiments disclosed herein, the one or more of the phase, amplitude, and frequency of the electrical utility grid can further correspond to a phase, amplitude, and frequency, respectively, of higher order harmonic of the electrical utility grid with respect to the fundamental harmonic.

In any of the embodiments disclosed herein, the one or more of the phase, amplitude, and frequency of the electrical utility grid can further correspond to a phase, amplitude, and frequency, respectively, of lower order harmonic of the electrical utility grid with respect to the fundamental harmonic.

In any of the embodiments disclosed herein, the power converter can be a single-phase electrical power converter.

In any of the embodiments disclosed herein, the power converter can be a three-phase electrical power converter.

In any of the embodiments disclosed herein, the system can further comprise a transceiver. The power converter can be configured such that if the one or more electrical parameters of the utility grid monitored by the power converter are out of a predetermined range, the power converter causes the transceiver to transmit the one or more electrical parameters of the utility grid that are out of the predetermined range to a remote device.

In any of the embodiments disclosed herein, the power converter can be further configured to update weights corresponding to one or more nodes in one or more layers of the deep learning neural network based on updated weights received from the remote device at the transceiver.

In any of the embodiments disclosed herein, the one or more electrical parameters of the utility grid can comprise an instantaneous voltage and an instantaneous current, wherein the power converter can be further configured to determine a reactance to resistance ratio of the utility grid in real time using the deep learning neural network.

Another embodiment of the present disclosure provides a method of controlling a power converter. The power converter can comprise an output configured to exchange electrical power with an electrical utility grid. The method can comprise: monitoring one or more electrical parameters of the electrical utility grid over a period of time; and altering one or more electrical parameters of the output of the power converter based on the monitored one or more electrical parameters of the electrical utility grid in real time using a deep learning neural network.

In any of the embodiments disclosed herein, the one or more electrical parameters of the utility grid can comprise an instantaneous voltage level of the electrical utility grid.

In any of the embodiments disclosed herein, altering one or more electrical parameters of the output of the power converter based on the monitored one or more electrical parameters of the electrical utility grid in real time using a deep learning neural network can comprise determining one or more of a phase, amplitude, and frequency of the electrical utility grid in real time using the deep learning neural network.

In any of the embodiments disclosed herein, altering one or more electrical parameters of the output of the power converter based on the monitored one or more electrical parameters of the electrical utility grid in real time using a deep learning neural network can comprise altering one or more electrical parameters of the output of the power converter by synchronizing one or more of a phase, amplitude, and frequency of the output of the power converter with the determined one or more of the phase, amplitude, and frequency of the electrical utility grid.

In any of the embodiments disclosed herein, the one or more of the phase, amplitude, and frequency of the electrical utility grid can correspond to a phase, amplitude, and frequency, respectively, of a fundamental harmonic of the electrical utility grid.

In any of the embodiments disclosed herein, the power converter can be a single-phase electrical power converter.

In any of the embodiments disclosed herein, the power converter can be a three-phase electrical power converter.

In any of the embodiments disclosed herein, the method can further comprise: determining that one or more electrical parameters of the utility grid monitored by the power converter are out of a predetermined range; and transmitting the one or more electrical parameters of the utility grid that are out of the predetermined range to a remote device.

In any of the embodiments disclosed herein, the method can further comprise updating weights in one or more nodes of one or more layers of the deep learning neural network based, at least in part, on the one or more electrical parameters of the utility grid that are out of the predetermined range.

In any of the embodiments disclosed herein, the one or more electrical parameters of the utility grid can comprise an instantaneous voltage and an instantaneous current, and the method can further comprise determining a reactance to resistance ratio of the utility grid in real time using the deep learning neural network.

In any of the embodiments disclosed herein, altering one or more electrical parameters of the output of the power converter based on the monitored one or more electrical parameters of the electrical utility grid in real time using a deep learning neural network, can comprise determining one or more of an active power, reactive power, power factor, and displacement power of the utility grid in real time using the deep learning neural network.

Another embodiment of the present disclosure provides a method of training a deep learning neural network to determine one or more parameters of an electric utility grid. The method can comprise: generating a synthetic set of data representative of a sinusoidal waveform representative of a possible electrical energy on a utility grid, wherein the synthetic set of data can comprise a plurality of deep learning neural network inputs, and wherein each of the inputs corresponds to a sum of a dc offset value, a fundamental harmonic value, sum of higher order harmonic values, sum of lower-order harmonic values, and one or more noise values; and training the deep learning neural network using the synthetic data set.

In any of the embodiments disclosed herein, training the deep learning neural network can comprise determining weights for nodes of the deep learning neural network.

In any of the embodiments disclosed herein, the method can further comprise transmitting the weights for the nodes of the deep learning neural network to a power converter utilizing a deep learning neural network.

In any of the embodiments disclosed herein, generating the synthetic set of data representative of a sinusoidal waveform representative of a possible electrical energy on a utility grid can comprise generating a plurality of values the dc offset value from 0 to a maximum dc offset value.

In any of the embodiments disclosed herein, generating the synthetic set of data representative of a sinusoidal waveform representative of a possible electrical energy on a utility grid can comprise generating a plurality of values for the fundamental harmonic value having the equation $A_1 \sin(\omega t + \phi_1)$, wherein $A_1$ corresponds to an amplitude of the fundamental harmonic, $\omega$ corresponds to a frequency of the fundamental harmonic, t corresponds to time, and $\phi_1$ corresponds to a phase of the fundamental harmonic.

In any of the embodiments disclosed herein, generating the synthetic set of data representative of a sinusoidal waveform representative of a possible electrical energy on a utility grid can comprise generating a plurality of values for the higher order harmonic value representative of N harmonics having the equation $\Sigma A_n \sin(n\omega t + \phi_n)$, wherein n is the current (not to be confused with electrical current) harmonic and is greater than one, $A_n$ is the amplitude of the $n^{th}$ harmonic, $\omega$ corresponds to a frequency of a fundamental harmonic, t corresponds to time, and $\phi_n$ corresponds to a phase of the nth harmonic.

In any of the embodiments disclosed herein, generating the synthetic set of data representative of a sinusoidal waveform representative of a possible electrical energy on a utility grid can comprise generating a plurality of values for the lower order harmonic value representative of N harmonics having the equation $\Sigma A_n \sin(n\omega t + (\phi_n))$, wherein n is the current (not to be confused with electrical current) harmonic and is lower than one, $A_n$ is the amplitude of the $n^{th}$ harmonic, ω corresponds to a frequency of a fundamental harmonic, t corresponds to time, and $\phi_n$ corresponds to a phase of the nth harmonic.

In any of the embodiments disclosed herein, generating the plurality of values for the higher order harmonic value can comprise utilizing a random function.

In any of the embodiments disclosed herein, generating the synthetic set of data representative of a sinusoidal waveform representative of a possible electrical energy on a utility grid can comprise generating a plurality of values for the noise value representative of a noise signal.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figures 1, 2A, 2B:
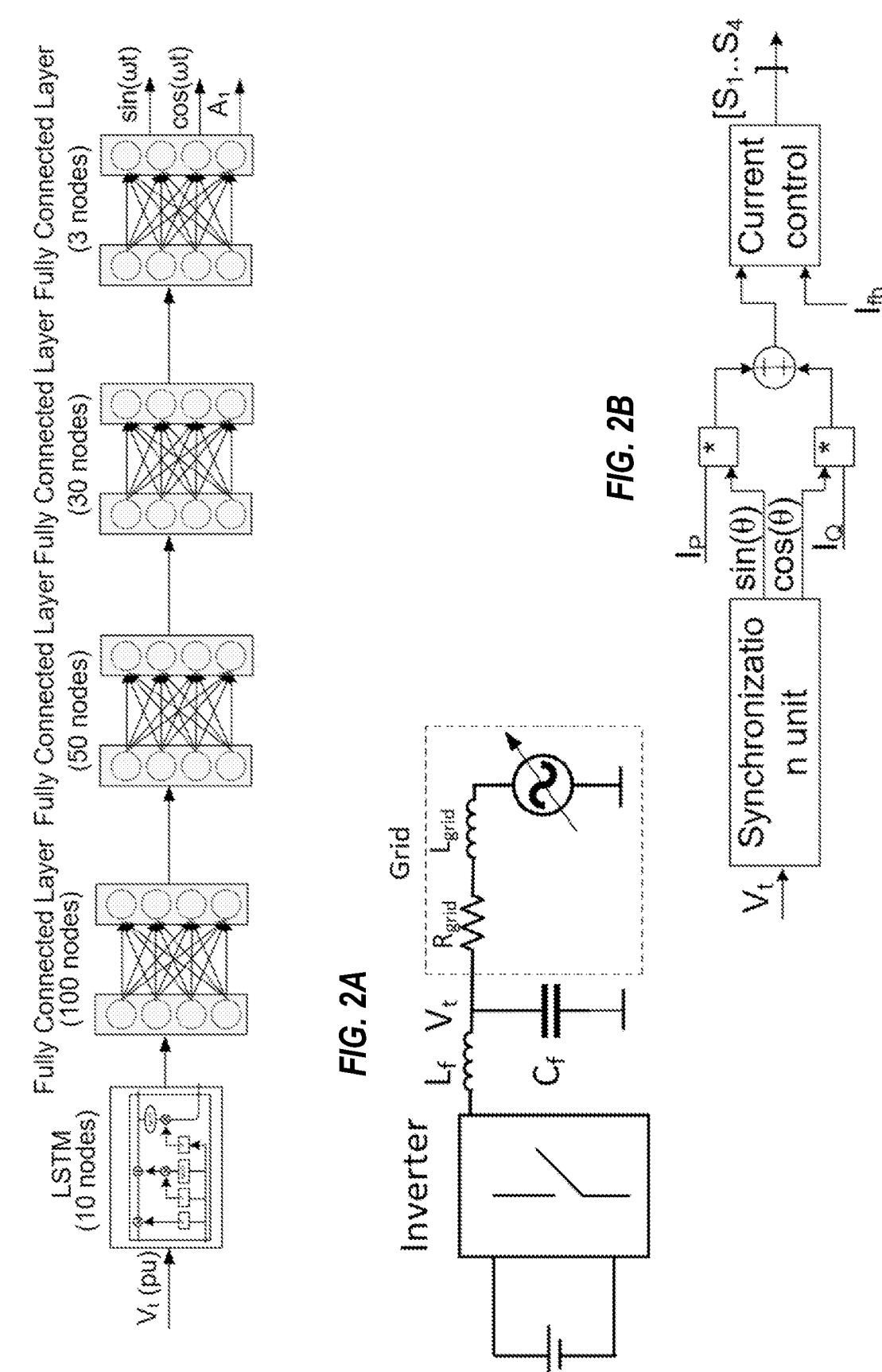
FIG. 1 provides a schematic of a deep learning neural network, in accordance with an exemplary embodiment of the present disclosure.
FIG. 2A provides a schematic of a power converter system used for simulation purposes, and FIG. 2B provides a schematic of a power converter system used for simulation purposes, in accordance with an exemplary embodiment of the present disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As discussed above, the problem with synchronization of a local power supply with an electric utility grid is a challenging one, particularly due to the difficulty of accurately and efficiently determining the various parameters of the electrical energy flowing on the grid, e.g., amplitude, frequency, and phase of voltage and/or current, active power, reactive power, power factor, displacement power of the grid, and the like. Accordingly, various embodiments of the present disclosure provide systems and methods capable of accurately and efficiently extracting various of these parameters. In some embodiments, these determinations can be used to alter electrical parameters of a local power supply to synchronize those parameters with corresponding parameters of the electrical utility grid.

As used herein, the term "local power supply," is used to refer to any power source/load that can connect to and exchange electrical energy with the electrical utility grid via a power converter, including, but not limited to, residential and commercial solar power systems, wind power systems, generators, batteries, one or more other power converter systems, and the like. The local power supply can provide/receive AC or DC power. If DC power is provided by the local power supply, the current can be converted to AC power to synchronize with the grid. Further, the local power supply can provide power with any number of phases, e.g., single phase or three-phase.

To make these determinations, various embodiments of the present disclosure make use of deep learning neural networks (DLNN). The DLNN's contemplated by the present disclosure can be multilayered wherein each layer comprises multiple nodes. The present disclosure is not limited to the use of a DLNN with any particular number of layers or number of nodes in each layer.

Synchronization of the local power supply with the grid can be thought of as a regression problem, where given an arbitrarily distorted sine waveform, the goal is to extract the phase of the fundamental harmonic. That is, given Equation 1, the aim is to find Equation 2:

$$x(t)=A_0+A_1 \sin(\omega t+\phi_1)+\Sigma_{n=1}^{N}A_n \sin(n\omega t+\phi_n)+d(t) \qquad \text{Equation 1}$$

$$y(t)=\omega t+\phi_1 \qquad \text{Equation 2}$$

where $\theta=\omega t+\phi_1$ is the phase of the fundamental harmonic, $A_0$ is the input dc offset, $A_n \sin(n\omega t+\phi_n)$ is the $n^{th}$ harmonic, and d(t) is sum of other disturbances, including noise, spikes, etc. Inter-harmonics and sub-synchronous harmonics can also be included by setting n as a random variable instead of being deterministic.

Since θ is a discontinuous function, learning the pattern along discontinuous points 0 or 2π might be hard. A more reasonable choice is to define the output as a 2-D continuous function shown in Equation 3:

$$y(t)=[\sin(\theta)\cos(\theta)] \qquad \text{Equation 3}$$

If the frequency and amplitude are also desired, the output can be expanded and be defined as a 4-D continuous function shown in Equation 4:

$$y(t)=[\sin(\theta)\cos(\theta)A_1\omega] \qquad \text{Equation 4}$$

As can be seen, the synchronization can be a highly nonlinear problem, and fast phase tracking can be enabled with a sophisticated structure that can learn all the nuances of the terminal voltage in presence of various types of distortions. To tackle this problem, embodiments of the present disclosure make use of a multi-layer neural network, consistent with the Universal Approximation Theorem. Based on the theorem, any arbitrary continuous function can be estimated by a neural network with bounded width and arbitrary depth or arbitrary width and bounded depth. Therefore, with a reasonable set of training data and a great enough number of iterations, a deep neural network can learn the complicated patterns in the training data that may not be otherwise analytically discoverable due to the vast computational requirements needed to do so.

A big challenge, however, is to generate a proper dataset that can be used to train the DLNN. The training dataset is preferably sufficiently large, diverse, and reasonable, to cover most of the practical scenarios encountered on the grid. A small dataset can lead to overfitting of the neural network, where any variation from the training set leads to unpredictable responses. Without sufficient diversity, the algorithm will fail in corner cases and might push the system into instability. In essence, an AI-based synchronization scheme can shift the design problem from gain setting to defining a proper dataset. But unlike PLLs, the range of operation of the DLNN can be easily extended by diversifying the dataset or making the DLNN bigger.

As discussed above, a challenge with the adoption of AI-based techniques in power electronics control can be the scarcity of data used to train the neural network. Most conventional systems generate data in the training phase based on simulation results. The problem, nonetheless, is that making a big dataset based on simulations can be generally very time consuming and can be difficult to scale for adoption in broader scenarios. For the synchronization problem discussed herein, embodiments of the present disclosure make allow for the generation of the training dataset (or a large portion thereof) synthetically. Further, if desired, additional data can be added for rare scenarios by doing simulations of those scenarios or by doing real experiments.

In accordance with some embodiments, methods of generating data for different parts of the input signal shown in Equation 1 (above) will be discussed. Note that the input signal here is in per-unit.

DC input $A_0$: The dc offset can be easily covered by sweeping the value from 0 to $A_{0,max}$.

Fundamental harmonic $A_1 \sin(\omega t+\phi_1)$: By defining a sine function and sweeping the amplitude from very low values $A_{1,min}$, i.e., corresponding to fault scenarios, to high values $A_{1,max}$, i.e., corresponding to overvoltage scenarios, the main signal can be defined. The frequency can be swept based on worst case scenarios, say [55, 65] (corresponding to ±5 Hz around the standard 60 Hz frequency of the US utility grid), though it should be noted that frequency sweeping may not be required in this range as will be demonstrated in the next section.

Harmonics $\sum_{n=1}^{N} A_n \sin(n\omega t+\phi_n)$: If the grid is stiff (i.e., the grid is less susceptible to outside influences), the training dataset can be generated by using the expected harmonic distribution. If, for example, only presence of odd harmonics is expected, then odd harmonics can be added to the input signal. The harmonic phase $\phi_n$ can depend on the lines impedance and loads characteristics, and is generated here as a uniformly random variable in $[0,2\pi]$. The harmonic amplitudes can also be defined based on their maximum expected values, and can be chosen to be Gaussian or uniformly random variables. If the grid is weak (i.e., the grid is more susceptible to outside influences), then inter-harmonics can also be considered. In a weak grid system, the power converter output can strongly affect its terminal voltage, hence a damping behavior can be added in all different range of frequencies to keep the system stable. That can be achieved by setting the harmonic frequencies nω as random variable instead of being deterministic.

Noise d(t): Adding noise to the training dataset can play two important roles in performance of the DLNN. First, it can robustify the neural network and prevent overfitting. Second, it can help the neural network to reject the high-frequency noises that are present in the system due to EMI, etc. Adding random spikes to the training data also can help the neural network to detect and reject such disturbances.

Using the methods discussed above, the scenarios a power converter might experience can be predicted, such that synthetic data to cover those scenarios can be generated.

Exemplary structure of a DLNN that can be used by various embodiments of the present disclosure will now be described. The selection of the structure of the neural network can depend on the application, size of the dataset, and complexity of the problem. FIG. 1 illustrates the structure for an exemplary DLNN used in various embodiments of the present disclosure. As shown in FIG. 1, the DLNN comprises five layers, though the disclosure is not so limited; rather, various embodiments can make use of DLNNs with any number of layers. The first layer is chosen to be a long short-term memory (LSTM) layer, because it shows an excellent performance in learning patterns of sequential data. The next layers comprise fully connected nodes. For example, the second layer comprises 100 nodes, the third layer comprises 50 nodes, the fourth layer comprises 30 nodes, and the fifth layer comprises three nodes. The disclosure is not limited to layers with any particular number of nodes; rather, various embodiments can employ layers with differing numbers of nodes and with different form of nodes, e.g., LSTM, RNN, etc.

Training a deep neural network can be expensive and can sometimes require powerful GPUs. Accordingly, in some embodiments, the DLNN can be trained offline (e.g., in a cloud server). The trained neural network comprises fixed gains (weights) and activation functions; thus, it may not be computationally expensive. Thus, these gains and activation functions can be determined at one location (e.g., remote cloud server) and transmitted to the power converter to be used there. Further, in some embodiments, the DLNN can be implemented in C code, which can easily be programmed and fit inside variety of cheap microcontrollers. These microcontrollers can be collocated with the power converter.

In some embodiments, the DLNNs disclosed herein can be retrained with additional data to adjust the weights, thus enhancing the performance of the system. This can be particularly helpful when the power converter is struggling to track the phase of the grid properly due to, for example, experiencing dramatic conditions that the deep neural network is not trained for. For example, the microcontroller can detect where it cannot track phase properly by measuring the DLNN output THD in a slower time basis and send the data to the cloud. The cloud server can process the data and re-train the neural network based on the identified corner cases. The new weights then could be sent to the microcontroller (e.g., via a transceiver at the power converter) through a firmware upgrade.

The following examples further illustrate aspects of the present disclosure. However, they are in no way a limitation of the teachings or disclosure of the present disclosure as set forth herein.

EXAMPLES

Two different simulation scenarios are defined to verify the performance of embodiments of the present disclosure, which are referred to below as "DeepSynch." The first scenario is for a system connected to a strong grid with no distortion. In this case, the neural network structure can be smaller, because harmonics data are not required to be part of the dataset. The second scenario, is for an inverter system connected to a weak grid. This scenario requires the training data to cover a wider range of harmonics.

The neural networks were trained in Python using Tensorflow Keras library. The sensor sampling time is set to 40 µs. In order to solely focus on the performance of the DeepSynch and avoid interaction with other control loops, the current magnitude is set to a fixed value ($I_P$=12 A and $I_Q$=5 A) and other loops are eliminated. In the following, more details about each scenario will be discussed.

Strong Grid

For this case, the neural network shown in FIG. 1 was picked. The input data dimension is 20, therefore the moving window width is 800 µs. The output dimension is three, including $\sin(\theta)$, $\cos(\theta)$ and $A_1$. $L_{grid}$ is set to zero.

The training data was created by the following algorithm. Amplitude is changed in steps of 0.05. Therefore, the range of amplitude is {0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1}. The frequency is selected to be fixed, i.e., w=2π60. A uniformly random variable in range of [−0.02, 0.02] is added to robustify the neural network, i.e., d(t)=U(−0.02, 0.02). A 20-dimension window is selected. For each 20 points, e.g., ({$x_1(t)$, $x_2(t)$, . . . , $x_{20}(t)$}), where $x_i(t)$=$A_1$ $\sin(\omega t_i)$+$d(t_i)$, the desired output is y(t)=[$\sin(\omega t_{11})$ $\cos(w t_{11})$ $A_1$].

Figure 3:
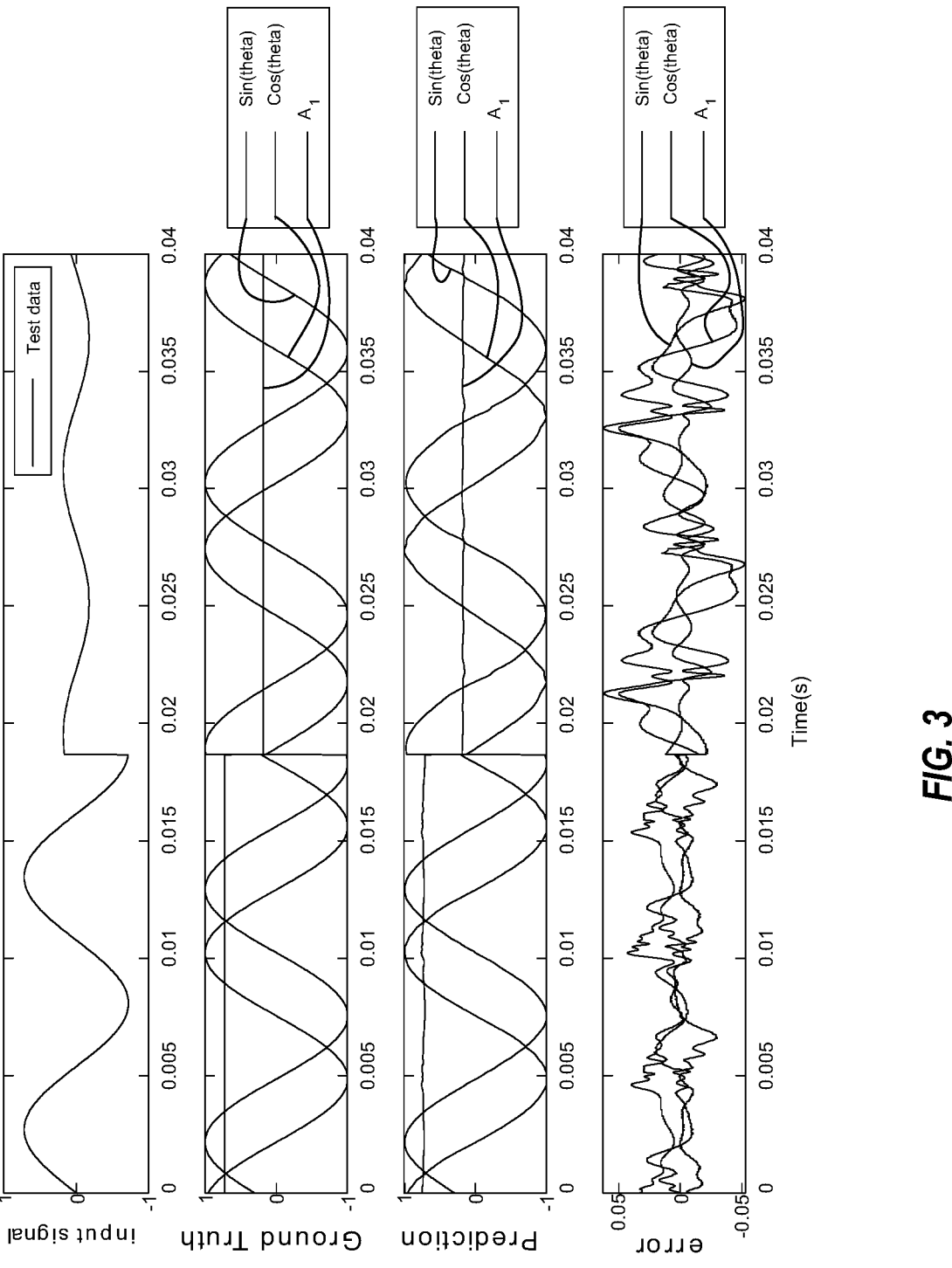
FIG. 3 provides results of a simulation of an exemplary embodiment of the present disclosure.

By sweeping the amplitude, a synthetic training dataset containing 15827 elements was created. An initial test was done in the python environment. The test data is a sine waveform with a major transient at t=0.0185. Before the transient, the amplitude and frequency values are 0.72, 62 Hz. During the transient, the phase jumps from 265° to 42.5°, frequency jumps from 62 Hz to 59 Hz and the amplitude jumps from 0.72 to 0.18. Note that neither amplitude nor frequency values are among the training dataset. The result can be seen in FIG. 3. According to FIG. 3, the error in this test setup does not go beyond 5%, which shows the accuracy is favorable.

In the next step, the trained network is transferred to MATLAB Simulink, with the schematic shown in FIG. 2. The scenario is as follows: At t=0.5 s, a minor incident occurs in the system, and phase jumps from 60° to 30°, and amplitude jumps from 1 pu to 0.96 pu. Then at t=1 s, a severe fault occurs, and phase jumps from 30° to 120°, amplitude jumps from 0.96 pu to 0.2 pu, and frequency jumps from 60

Hz to 62 Hz. At t=2 s, the system recovers, the amplitude and frequency return to 1 pu, and phase again jumps from 120° to 0°.

Figure 4:
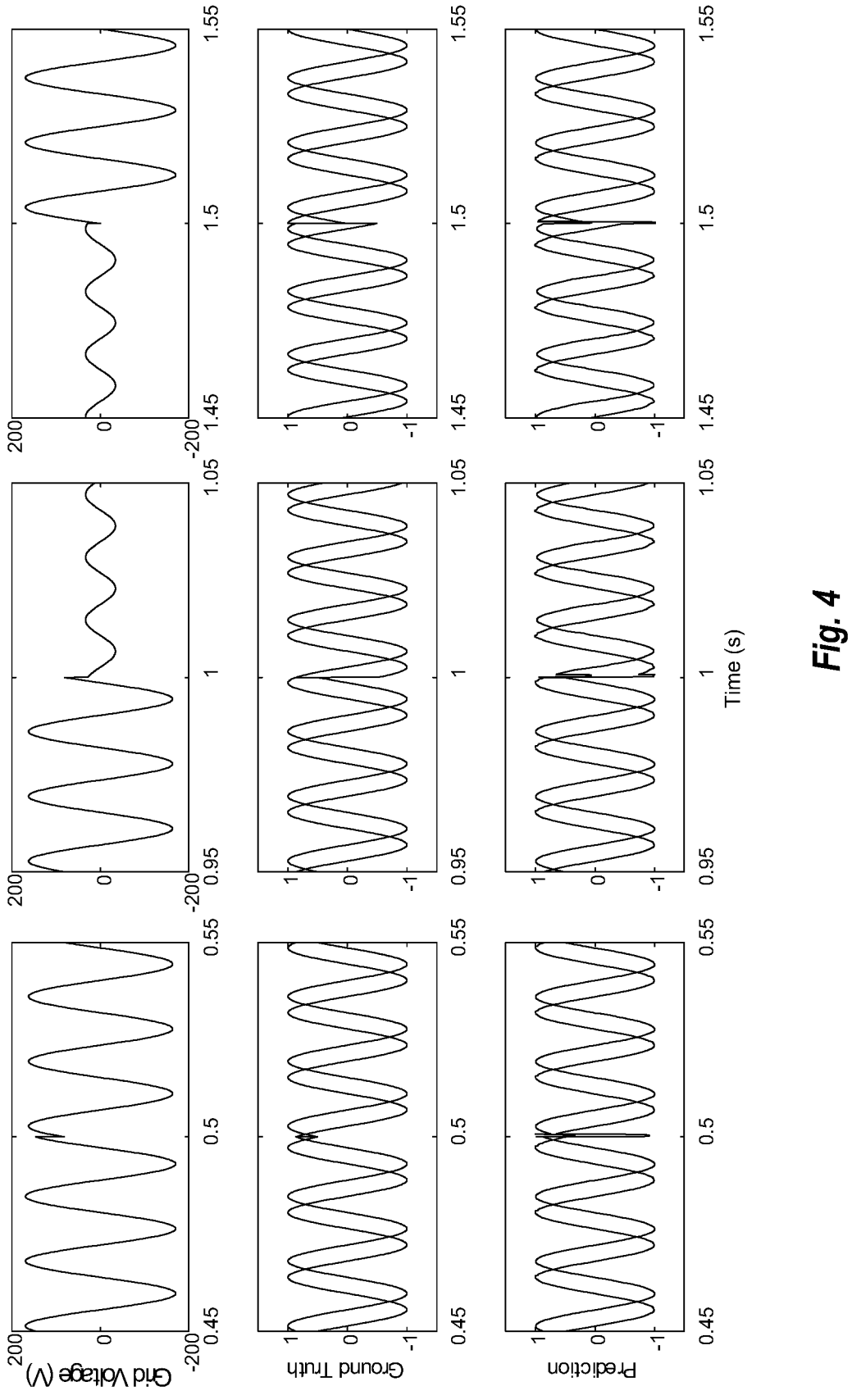
FIG. 4 provides simulated dynamic performance of an exemplary embodiment of the present disclosure.
Figure 5:
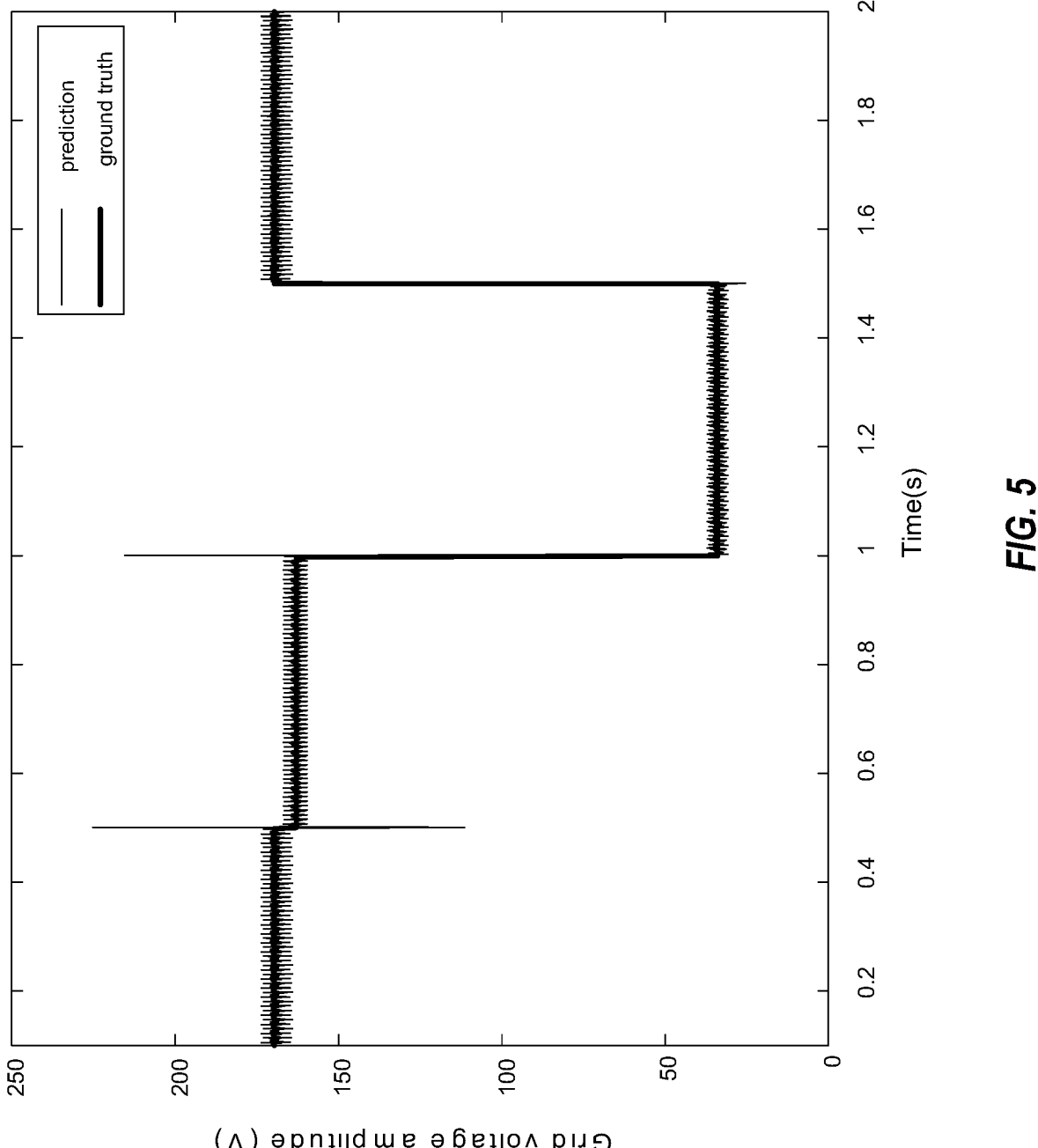
FIG. 5 provides simulated amplitude estimation of an exemplary embodiment of the present disclosure.

FIG. 4 shows the dynamic performance of DeepSynch. It is seen that DeepSynch can quickly get synced with the grid after each transient. FIG. 5 shows the amplitude estimation of DeepSynch which proves that it can quickly track the new operating point in a fast and stable manner.

Figure 6:
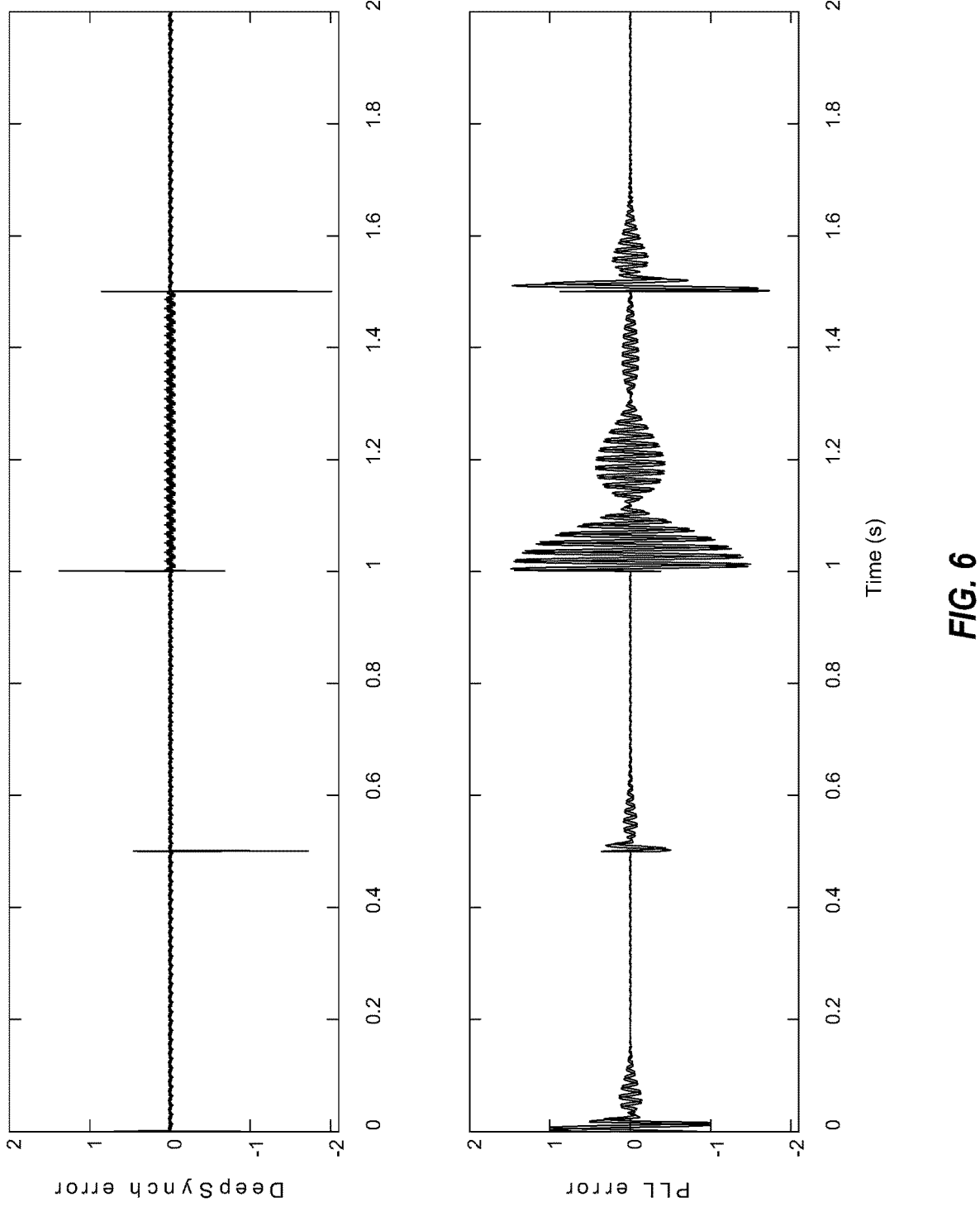
FIG. 6 provides a plot of simulated error estimation of an exemplary embodiment of the present disclosure as compared to a conventional system.
Figure 7:
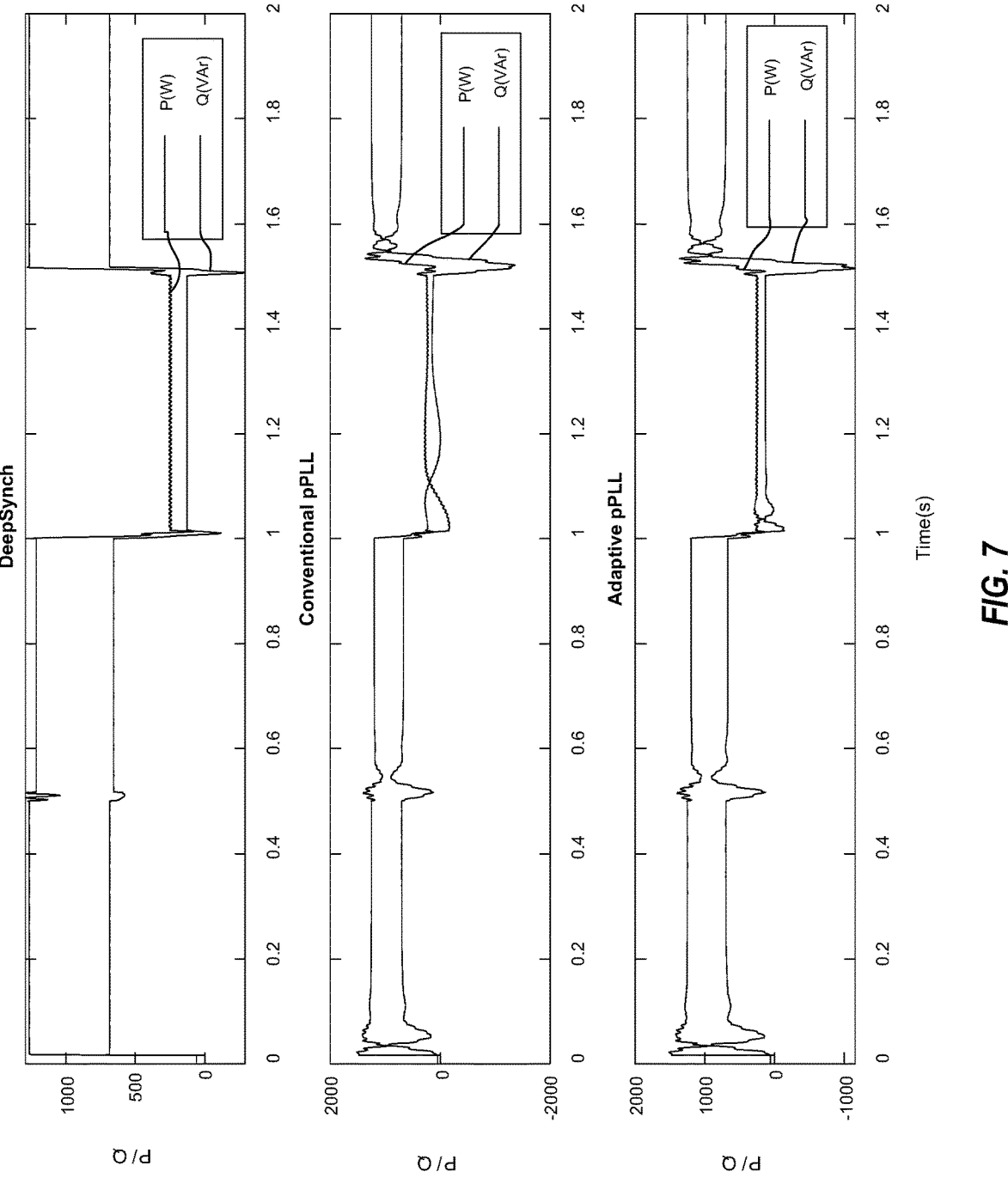
FIG. 7 provides a plot of power converter output for an exemplary embodiment of the present disclosure as compared to two conventional systems.

To better see the performance of the method, DeepSynch is replaced with a conventional PLL and the scenario is repeated. FIG. 6 shows the estimation error for both methods. It is clearly seen that DeepSynch quickly recovers, but dynamic response of PLL is oscillatory. FIG. 7 shows the inverter output power for DeepSynch, conventional PLL and adaptive-gain PLL. Adaptive-gain PLL shows a better damped response compared to conventional PLL, but still its dynamic performance is worse than DeepSynch. In sum, the results show that DeepSynch dynamic performance is superior compared to conventional methods when connected to a strong power system.

Weak Grid

When the grid becomes weak, the inverter generated voltage affects its terminal, therefore it is desirable for the inverter to demonstrate a damping behavior in a wide range of frequencies. Our simulation results show that it is enough to consider harmonics up to 3500 Hz. To damp low-order harmonics, the window length was increased from 800 µs to 8 ms, i.e., it covers half of a cycle.

The training dataset was generated by the following algorithm. Amplitude is changed in steps of 0.05. Therefore, the range of amplitude is {0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1}. The frequency is selected to be fixed, i.e., w=2π60. d(t) is defined to be more aggressive to robustify the neural network even more. In this case, d(t)=U(−1, 1)×$A_1$×k, where k={0.2, 0.4, 0.6}. To cover harmonics, the frequency spectrum is divided into different intervals as following: {[2, 3], [3, 4], [4, 5], [5, 6], [6, 8], [8, 10], [10, 12], [12, 15], [15, 20], [20, 25], [25, 30], [30, 45], [45, 70]}. Note that the higher frequencies window width is wider because they are easier to detect. The low-order harmonics patterns are more complicated, hence the width of each interval is tighter.

Each harmonic term could be represented as: $h_n(t)$=$A_n$ $\sin(n\omega t+\phi_n)$. The following algorithm is performed to generate harmonics data for a particular range. Pick a uniformly random variable for $\phi$, i.e., $\phi_i(t)$~U[0,2π]. Pick a uniformly random variable from each interval, i.e., n~U[$h_{min}$,$h_{max}$]. Then, pick the harmonic amplitude as a random variable and function of $A_1$: $A_n$~U [0, 2$A_1$]. Then, add the generated harmonic signal to the main signal.

The above algorithm was repeated N times and for each fundamental harmonic step. However, it only covers one harmonic at a time. Sometimes, a wide range of harmonics appear on the voltage. To cover this, the following algorithm has been implemented. Pick 13 random variables for $\phi$, i.e., $\phi_i(t)$~U[0,2π]. Then, pick 13 uniformly random variables from each interval, i.e., $n_i$~U[$h_{min}$,$h_{max}$]. Then, pick 13 random variables for each harmonic amplitude, i.e., $A_i$~U [0,1]. Then, normalize every random variable and multiply it by (2×$A_1$). That is:

$$A_i' = \frac{A_i}{\left[\sum_{i=2}^{14} A_i\right]} \times 2A_1.$$

Then, sum up all 13 harmonic elements with the main harmonic. Repeat the steps above N times.

Figures 8, 9A, 9B:
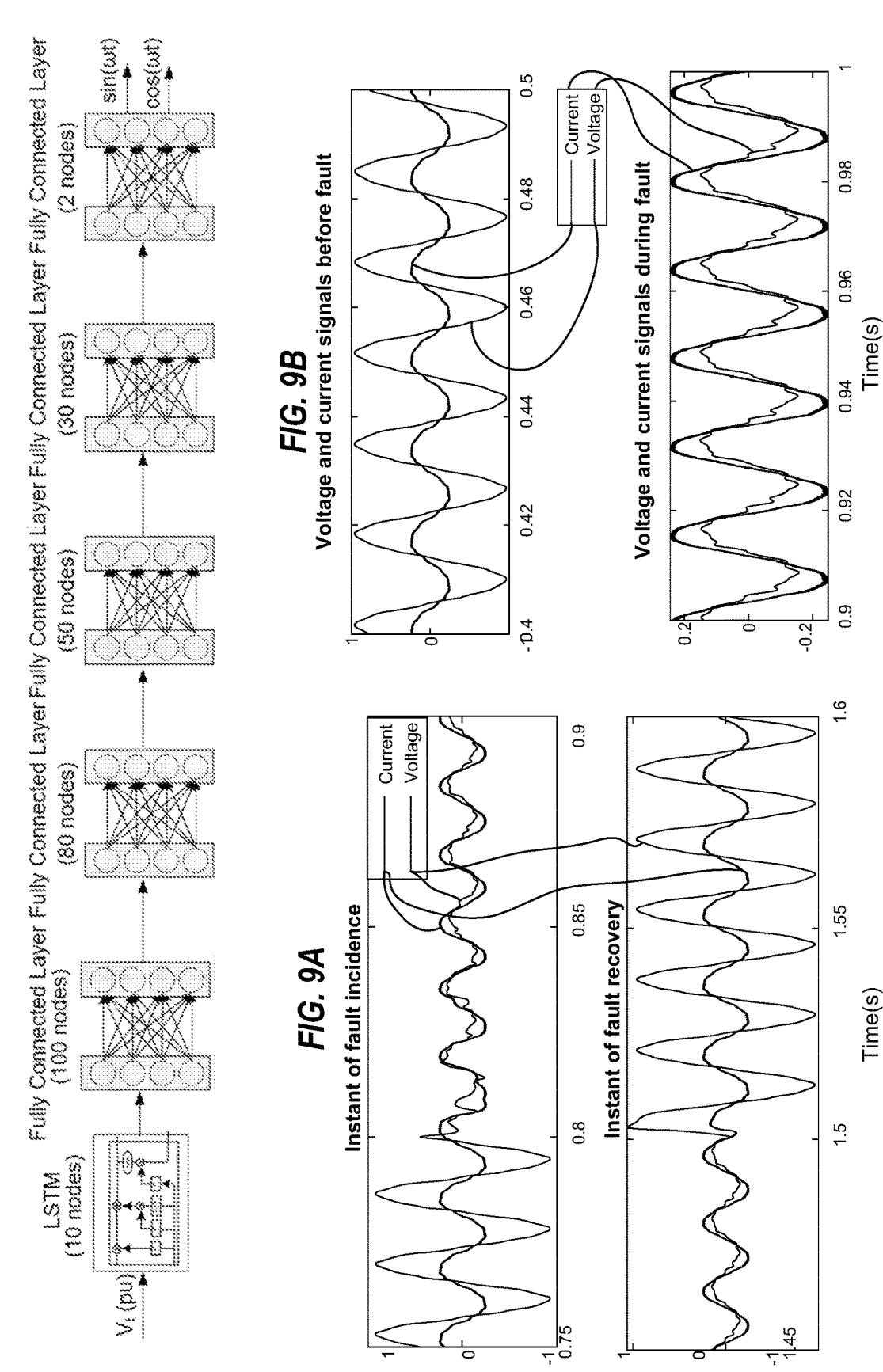
FIG. 8 provides a schematic of a deep learning neural network, in accordance with an exemplary embodiment of the present disclosure.
FIG. 9A provides simulated results of an exemplary embodiment of the present disclosure experiencing fault incidence.
FIG. 9B provides simulated results of an exemplary embodiment of the present disclosure experiencing fault clearance.
Figure 9C:
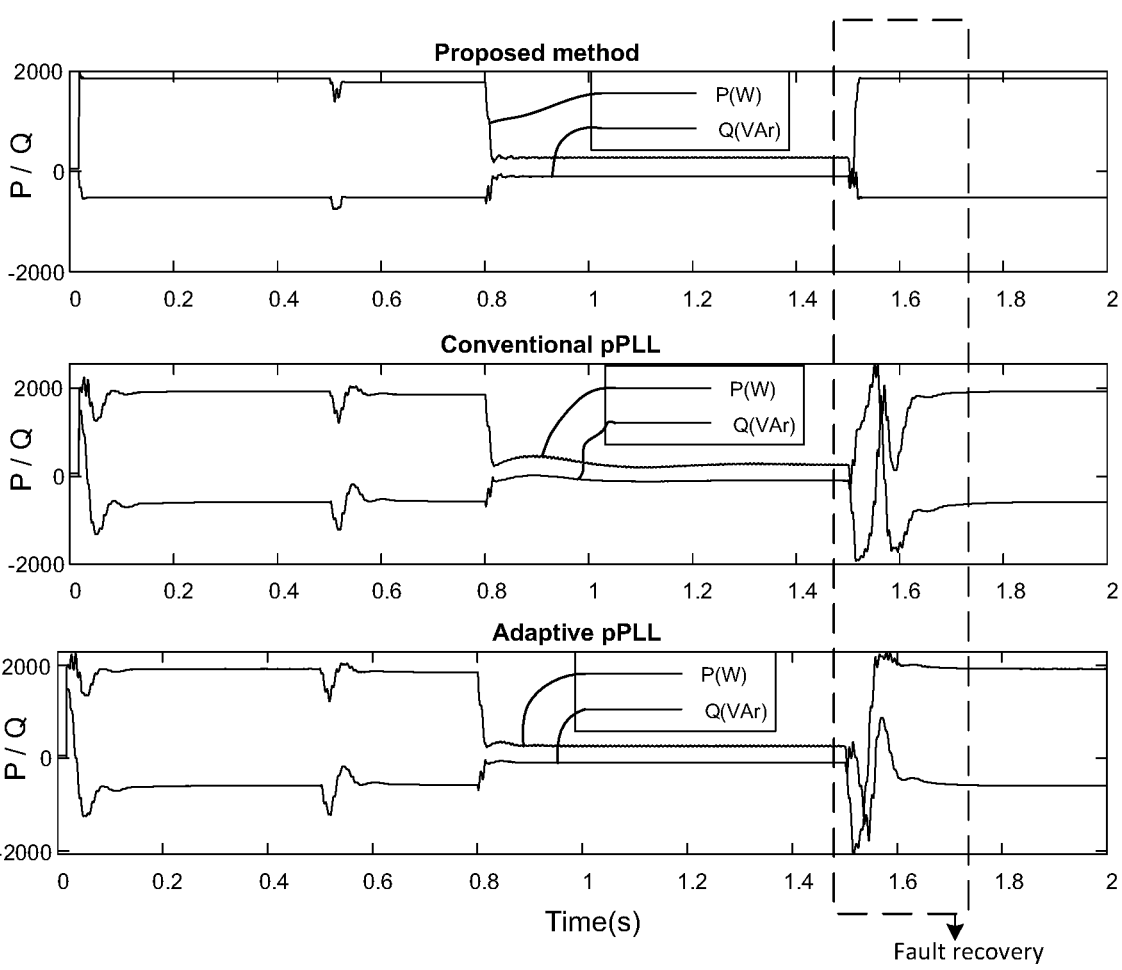
FIG. 9C provides a simulated comparison of an exemplary embodiment of the present disclosure and two conventional systems.

The final dataset contains 7605420 samples. The trained neural network structure is shown in FIG. 8. The network was tested on power converter connected to a weak grid with a short-circuit ratio of 6.7. The scenario is the same as the one for the strong grid. FIGS. 9A-B show the voltage and current during incidents and FIG. 9C shows the active and reactive power of the inverter during the transient for the DeepSynch, conventional PLL, and adaptive-gain PLL. DeepSynch shows a better dynamic performance; it follows the transients fast with little distortion, while PLL has an oscillatory and sluggish response. Increasing the bandwidth of PLL to have a faster response leads to even more oscillations in this scenario. As stated before, DeepSynch can be insensitive to frequency variations and it can be clearly seen here. The neural network was only trained for 60 Hz, but it can precisely follow 62 Hz waveform during fault incidence with no phase shift. This feature could be of benefit for proper operation in frequency-variable environments like distributed microgrids.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A power converter system comprising:
a power converter electrically connected to a local power supply and an electrical utility grid;
wherein the power converter is configured to:
exchange electrical power with the electrical utility grid via an output;
monitor one or more electrical parameters of the electrical utility grid;
in real time using one or more deep learning neural networks (DLNNs), determine one or more of a phase, amplitude, or frequency of the electrical utility grid; and
in real time using one or more of the DLNNs, alter one or more electrical parameters of the output of the power converter based on the monitored one or more electrical parameters of the electrical utility grid.

2. The power converter system of claim 1, wherein the power converter is configured to alter the one or more electrical parameters of the output of the power converter by synchronizing one or more of the phase, amplitude, or frequency of the output of the power converter with the determined one or more of the phase, amplitude, or frequency of the electrical utility grid.

3. The power converter system of claim 1, wherein the one or more of the phase, amplitude, or frequency of the electrical utility grid corresponds to a phase, amplitude, or frequency, respectively, of a fundamental harmonic of the electrical utility grid.

4. The power converter system of claim 3, wherein the one or more of the phase, amplitude, or frequency of the electrical utility grid further corresponds to a phase, amplitude, and frequency, respectively, of a higher order harmonic of the electrical utility grid with respect to the fundamental harmonic.

5. The power converter system of claim 3, wherein the one or more of the phase, amplitude, or frequency of the electrical utility grid further corresponds to a phase, amplitude, or frequency, respectively, of a lower order harmonic of the electrical utility grid with respect to the fundamental harmonic.

6. The power converter system of claim 1, wherein the power converter is selected from the group consisting of a single-phase electrical power converter and a three-phase electrical power converter.

7. The power converter system of claim 1 further comprising a transceiver;
wherein the power converter is further configured such that if the one or more electrical parameters of the utility grid monitored by the power converter are out of a predetermined range, the power converter causes the transceiver to transmit the one or more electrical parameters of the utility grid that are out of the predetermined range to a remote device.

8. The power converter system of claim 7, wherein the power converter is further configured to update weights corresponding to one or more nodes in one or more layers of one or more of the DLNNs based on updated weights received from the remote device.

9. The power converter system of claim 1 further comprising a transceiver;
wherein the power converter is further configured to, in real time using one or more of the DLNNs, determine one or more of an active power, reactive power, power factor, and displacement power of the electrical utility grid;
wherein the power converter is further configured to alter the one or more electrical parameters of the output of the power converter by synchronizing one or more of the phase, amplitude, frequency, active power, reactive power, power factor, or displacement power of the output of the power converter with the determined one or more of the phase, amplitude, frequency, active power, reactive power, power factor, or displacement power of the electrical utility grid;
wherein the one or more of the phase, amplitude, or frequency of the electrical utility grid corresponds to a phase, amplitude, or frequency, respectively, of a harmonic selected from the group consisting of a fundamental harmonic, a higher order harmonic, and a lower order harmonic of the electrical utility grid;
wherein the power converter is further configured such that if the one or more electrical parameters of the utility grid monitored by the power converter are out of a predetermined range, the power converter causes the transceiver to transmit the one or more electrical parameters of the utility grid that are out of the predetermined range to a remote device;

wherein the power converter is further configured to update weights corresponding to one or more nodes in one or more layers of one or more of the DLNNs based on updated weights received from the remote device;

wherein the one or more electrical parameters of the utility grid comprises an instantaneous voltage and an instantaneous current; and wherein the power converter is further configured to determine a reactance to resistance ratio of the utility grid in real time using one or more of the DLNNs.

10. A method of controlling a power converter comprising:

monitoring one or more electrical parameters of an electrical utility grid over a period of time; and in real time using one or more deep learning neural networks (DLNNs), altering one or more electrical parameters of an output of a power converter configured to exchange electrical power with an electrical utility grid based on the monitored one or more electrical parameters of the electrical utility grid.

11. The method of claim 10, wherein the one or more electrical parameters of the utility grid comprise an instantaneous voltage level of the electrical utility grid.

12. The method of claim 10, wherein altering comprises determining one or more of a phase, amplitude, or frequency of the electrical utility grid in real time using one or more of the DLNNs.

13. The method of claim 12, wherein altering further comprises altering one or more electrical parameters of the output of the power converter by synchronizing one or more of a phase, amplitude, or frequency of the output of the power converter with the determined one or more of the phase, amplitude, or frequency of the electrical utility grid.

14. The method of claim 13, wherein the one or more of the phase, amplitude, or frequency of the electrical utility grid corresponds to a phase, amplitude, or frequency, respectively, of a harmonic selected from the group consisting of a fundamental harmonic, a higher order harmonic, and a lower order harmonic of the electrical utility grid.

15. The method of claim 14 further comprising:

determining that one or more of the monitored electrical parameters of the utility grid are out of a predetermined range; and transmitting the one or more electrical parameters of the utility grid that are out of the predetermined range to a remote device.

16. The method of claim 15 further comprising updating weights in one or more nodes of one or more layers of one or more of the DLNNs based, at least in part, on the one or more electrical parameters of the utility grid that are out of the predetermined range.

17. The method of claim 15, wherein the one or more electrical parameters of the utility grid comprises an instantaneous voltage and an instantaneous current; and wherein the method further comprises:

determining a reactance to resistance ratio of the utility grid in real time using one or more of the DLNNs; and determining one or more of an active power, reactive power, power factor, and displacement power of the utility grid in real time using one or more of the DLNNs.

18. A method of training a deep learning neural network (DLNN) comprising:

generating a synthetic set of data representative of a sinusoidal waveform representative of a possible electrical energy on an electric utility grid; and training the DLNN using the synthetic set of data;

wherein the synthetic set of data comprises deep learning neural network inputs corresponding to a sum of a dc offset value, a fundamental harmonic value, a sum of higher order harmonic values, a sum of lower order harmonic values, and a sum of one or more noise values.

19. The method of claim 18, wherein training the DLNN comprises determining weights for nodes of the DLNN.

20. The method of claim 19 further comprising transmitting the weights for the nodes of the DLNN to a power converter utilizing the DLNN.

21. The method of claim 20, wherein generating comprises:

generating a plurality of values the dc offset value from 0 to a maximum dc offset value;

generating a plurality of values for the fundamental harmonic value having the equation $A_1 \sin(\omega t + \phi_1)$, wherein $A_1$ corresponds to an amplitude of the fundamental harmonic, $\omega$ corresponds to a frequency of the fundamental harmonic, t corresponds to time, and $\phi_1$ corresponds to a phase of the fundamental harmonic;

generating a plurality of values for the higher order harmonic value representative of N harmonics having the equation $\Sigma_{n=1}^{N} A_n \sin(n\omega t + \phi_n)$, wherein N is the total number of harmonics, n is the current harmonic, $A_n$ is the amplitude of the nth harmonic, $\omega$ corresponds to a frequency of a fundamental harmonic, t corresponds to time, and $\phi_n$ corresponds to a phase of the nth harmonic; and generating a plurality of values for a lower order harmonic value representative of N harmonics having the equation $\Sigma_{n=1}^{N} A_n \sin(n\omega t + \phi_n)$, wherein N is the total number of harmonics, n is the current harmonic, $A_n$ is the amplitude of the nth harmonic, $\omega$ corresponds to a frequency of a fundamental harmonic, t corresponds to time, and $\phi_n$ corresponds to a phase of the nth harmonic.

22. The method of claim 21, wherein generating the plurality of values for the higher order harmonic value comprises utilizing a random function;

wherein generating the plurality of values for the lower order harmonic value comprises utilizing a random function; and wherein generating further generating a plurality of values for the one or more noise values representative of one or more noise signals.

* * * * *